July 14, 1936.  G. D. WALLER  2,047,342
FIRE HOSE RACK
Filed Sept. 19, 1935
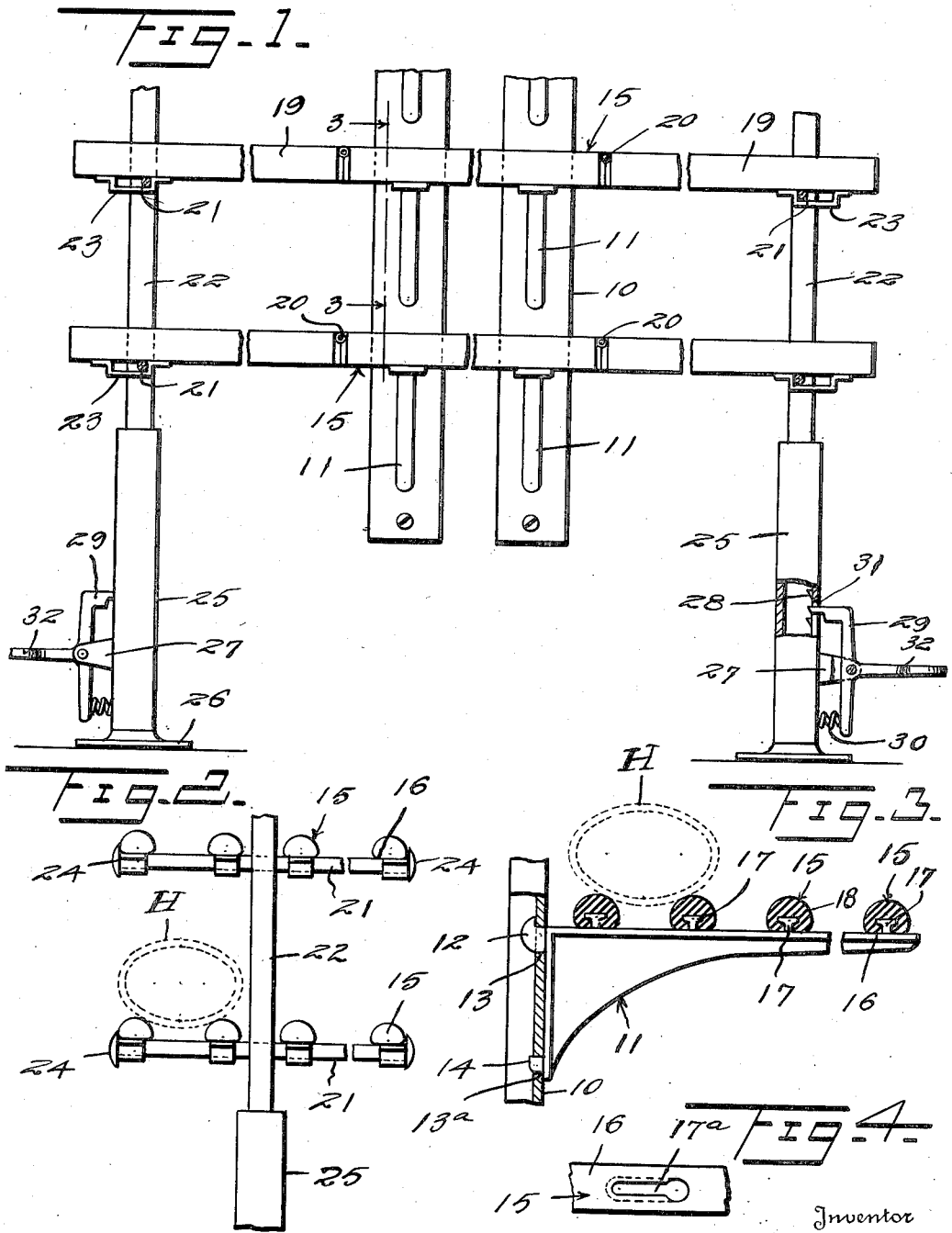
Inventor
G. D. Waller
By Watson E. Coleman
Attorney Patented July 14, 1936

2,047,342

UNITED STATES PATENT OFFICE 2,047,342

FIRE HOSE RACK

George D. Waller, Nashville, Tenn.

Application September 19, 1935, Serial No. 41,332

3 Claims. (Cl. 248—89)

This invention relates to racks and more particularly to a rack constructed for use in holding lengths of hose.

An object of this invention is to provide a rack structure which is adapted to receive lengths of hose and particularly fire hose, or the like, in straight unfolded form so that the hose can be suitably ventilated on both the outside and the inside.

Another object of this invention is to provide a hose supporting means which is so constructed that the hose may not only be ventilated on the inside and outside but where desired, water can be placed on the inside of the hose for as long a period as may be desired, and retained in the hose while on the support or rack, and the water may at will be gravitatingly drained from the hose without removing the hose from the rack.

A further object of this invention is to provide in a stationary hose supporting rack for supporting the hose in straight form, means at either or both ends of the rack for elevating a portion of the rack at either or both ends so as to trap water in the hose in order to maintain the interior of the hose in a moistened condition while at the same time permitting free circulation of air about the hose and, if desired, within the interior of the hose after the water has been drained therefrom.

The above and various other objects and advantages of this invention will in part be described and in part be understood from the following detailed description of the present preferred embodiment, the same being illustrated in the accompanying drawing wherein:

Figure 1 is a front elevation partly broken away and partly in section of a device constructed according to the preferred embodiment of this invention;

Figure 2 is a fragmentary end elevation of the device;

Figure 3 is a sectional view taken on the line 3—3 of Figure 1;

Figure 4 is a fragmentary bottom plan view of one of the hose supporting slats showing the recess or opening whereby the slats may be detachably mounted on brackets.

Referring to the drawing wherein like numerals of reference designate corresponding parts throughout the several views, the numeral 10 designates generally an elongated vertically disposed bar or channel section, preferably of metal or the like, which is provided at desired points therealong with horizontal slots 13 and at a given distance below each slot 13 in a vertical line with the same, a hole 13$^a$. The bar 10 may be secured to a suitable support such as a wall or post or the like, by bolts or lag screws or other fastening devices.

The bracket member, generally designated as 11, which is provided on the vertical leg thereof with a tapered pin or lug 14 and at the top with an upward turned hook member 12 adjacent the upward portion thereof, is adapted to be detachably secured to the bar 10 by raising the bracket 11 to a diagonal position and introducing the hook 12 into a selected slot 13 and by lowering the bracket 11 to a horizontal position, the tapered pin 14 will engage in the hole 13$^a$, making the bracket 11 steady under the imposed load.

Preferably, there are a series of these brackets 11 disposed in superposed position and in spaced relation to each other along the length of the vertical bar 10, and as many vertical bars 10 may be used as may be considered necessary for supporting the desired fire hose.

In order to maintain the fire hose between the brackets in a straight form and so as to eliminate the possibility of corrosion or the like, I have provided a plurality of hose supporting slats 15, preferably of wood or of non-corrosive metal, which are disposed in pairs and extend between the brackets 11. The slats or elongated bars 15 are preferably provided with a flat lower face portion 16 engaging the top or horizontal portion of the bracket 11 and headed pins 17 are preferably fixed to the top of the bracket 11 and engage in buttonhole slots or dove-tail channels 17$^a$ so that the slats or bars 15 may be removably secured to the brackets 11.

The upper surface 18 of these slats or hose supporting members 15 is preferably rounded and in practice, pairs of slats 15 are disposed in such spaced relation to each other so as to hold a single length of hose therebetween, the hose H being disposed in elliptical form between pairs of these slats 15. By supporting the hose H in a manner whereby it will be maintained in elliptical instead of flat form, it is possible to provide free circulation of air through the length of each string of hose while at the same time permitting the free circulation of air on the outside of the hose.

These slats 15 may be disposed in horizontal position or, if desired, may be disposed on a slight inclination to the horizontal so that the hose disposed thereon will drain from one end to the other. Preferably, however, the slats 15 are disposed in a horizontal position and the opposite ends of the slats 15 are provided with extensions 19 which are swingably secured as by hinges 20, or the like, to the ends of the fixed slats 15. These slat extensions 19 engage across bars or horizontal bars 21 which are secured to a vertically shiftable standard 22. The extensions 19 are each provided with a looped strap 23 on the lower surface thereof adjacent the outer end which loosely engages about the horizontal bar 21. Each bar 21 is provided with a head 24 at each end thereof so as to prevent the loops 23 from slipping off and, if desired, these heads 24 may be removable. A tubular fixed standard 25 having a base 26 loosely engages about the shiftable standard 22, and this tubular or fixed standard 25 has a pair of outstanding lugs 27 secured thereto adjacent the lower end. Preferably, the shiftable standard 22 has recesses 28 therein within a selected one of which a pivotal pawl 29 is adapted to engage so as to hold the shiftable standard 22 in desired upraised position. A spring 30 constantly urges the pawl 29 into locked position. The standard 25 has an opening 31 therethrough within which the pawl 29 loosely engages and preferably the pawl 29 is so constructed that the movable part 22 may be raised without shifting the pawl 29 in released position. A lever 32 is secured to the pawl 29 in outstanding position and is constructed in the form of a pedal or the like, and is adapted to be engaged by a foot for depression thereof so as to swing the pawl 29 into released position.

The standard 25 with the spring pressed member 29 are here shown as one means for raising or lowering the hinged extensions 19, and it will be understood that this raising and lowering means may be substituted by any suitable jack structure.

There are two of these standards including the shiftable member 22 and the fixed member 25, one at each end of the rack structure, so that the extensions 19 may be raised or elevated to the desired angle and thereby form a trap at either one or both ends of the hose H which is mounted on the rack bars 15. If desired, there may be only one of these standards in the case where the rack bars 15 are mounted on an inclination to the horizontal and this standard disposed at the lower ends of the rack bars 15. The brackets 11 may be of any desired length so as to support as many lengths of hose H as may be desired.

In the use of the hose rack structure hereinbefore described, the vertical bar 10 may be of suitable length so as to hold the desired number of horizontal bracket members 11 thereon in vertically spaced relation to each other and a number of these bars 10 disposed in horizontally spaced relation to each other along the side of a wall. The pairs of hose supporting slats are secured to the top of the horizontal bars 11, and these slats 15 are of a length sufficient to hold the hose in straight form either in a horizontal position or in an inclination to the horizontal so that it will not be necessary to fold or bend the hose when disposed on the rack structure. By mounting the hose H between pairs of these rack bars 15, the hose will assume an elliptical configuration rather than a flat form as would be the case where the hose is mounted on a plane surface. Where it is desired to moisten the interior of the hose H while mounted on the rack structure and to keep the inside of the hose moistened for a predetermined period of time, the extensions 19 at either or both ends of the bars 15 may be raised by elevating the movable standard 22. The pawl 29 will hold the standard 22 in extended position and while in this position, the hose H adjacent each end will be slightly bent upwardly thereby forming a pocket or trap preventing the water which is placed on the inside from draining out of the hose. After the water has been placed in the hose and the extensions 19 elevated, the water can be quickly drained out of the hose by merely pressing the lever or pedal 32 releasing the pawl 29 from a selected notch or recess 28 and permitting the movable member 22 to be lowered. The lowering of the member 22 will carry therewith the extensions 19 which in their lowered position will be in substantial axial alinement with the bars 15.

It is, of course, understood that various changes and modifications may be made in the details of construction and design of the above specifically described embodiment of this invention without departing from the spirit thereof, such changes and modifications being restricted only by the scope of the following claims.

I claim:—

1. A hose rack, comprising a series of horizontally spaced brackets, a pair of hose supporting bars secured to said series of brackets in spaced relation to each other to hold a length of hose in straight form, each of said bars having an upper surface shaped to cause the hose to assume an elliptical form transversely of its length, an extension pivotally secured to an end of each bar, and means engaging each of said extensions for holding said extensions in either a horizontal position or in a position inclined to the horizontal.

2. A hose rack, comprising a series of horizontally spaced brackets, pairs of elongated hose supporting bars secured to said series of brackets in spaced relation to each other, each pair of said bars being also spaced apart in a manner to hold a hose upon the upper surface thereof in elliptical form transversely of the length of the hose, a pair of extensions pivotally secured to the ends of each pair of bars, a fixed standard, a vertically shiftable member slidable relative to said fixed standard, means carried by said shiftable member and engaging said pairs of extensions, and releasable means carried by said fixed standard and engaging said shiftable member to hold said extensions in either a horizontal position or an upwardly inclined position whereby to form a water trap in the lengths of hose disposed on top of said pairs of supporting bars.

3. A hose rack, comprising a series of horizontally spaced brackets, a pair of elongated hose supporting bars secured in spaced relation to each other on said series of brackets, a pivoted extension for an end of each bar and each extension having a curved upper surface whereby to prevent a hose disposed on the upper surface thereof from flattening out, a fixed standard disposed adjacent said extensions, a vertically movable member slidable in said standard, said member having a plurality of recesses disposed in spaced relation to each other adjacent the lower end thereof, a horizontal bar secured to said vertically movable member and engaging beneath said pair of extensions, a looped strap secured to the under side of each extension and loosely engaging about said bar, a spring pressed pawl pivotally secured to said fixed standard and adapted to engage in a selected recess of said vertically movable member to hold said extensions in either a horizontal position or a position inclined upwardly relative to the horizontal, and means for releasing said pawl whereby to permit said extensions to gravitatingly move downwardly into a horizontal position.

GEORGE D. WALLER.